(12) United States Patent
Booton (10) Patent No.: US 8,280,032 B2
(45) Date of Patent: Oct. 2, 2012

(54) REGISTRATION OF A TELEPHONE/COMPUTER ASSOCIATION IN A COMPUTER TELEPHONY INTEGRATION ENVIRONMENT

(75) Inventor: Laurence J Booton, Woodbridge (GB)

(73) Assignee: British Telecommunications Public Limited Company, London (GB)

( * ) Notice: Subject to any disclaimer, the term of this patent is extended or adjusted under 35 U.S.C. 154(b) by 1464 days.

(21) Appl. No.: 11/794,501

(22) PCT Filed: Dec. 23, 2005

(86) PCT No.: PCT/GB2005/005072
§ 371 (c)(1),
(2), (4) Date: Jun. 29, 2007

(87) PCT Pub. No.: WO2006/070187
PCT Pub. Date: Jul. 6, 2006

(65) Prior Publication Data
US 2008/0089493 A1    Apr. 17, 2008

(30) Foreign Application Priority Data
Dec. 31, 2004    (GB) .................................. 0428538.3

(51) Int. Cl.
*H04M 3/42* (2006.01)
*H04M 3/00* (2006.01)
*H04M 5/00* (2006.01)
(52) U.S. Cl. .......... 379/266.09; 379/211.02; 379/265.04
(58) Field of Classification Search ............. 379/201.03, 379/211.02, 265.04, 266.09
See application file for complete search history.

(56) References Cited

U.S. PATENT DOCUMENTS
6,359,711 B1 * 3/2002 Cole et al. ........................ 398/58
(Continued)

FOREIGN PATENT DOCUMENTS
EP    1511284 A1    3/2005
(Continued)

OTHER PUBLICATIONS
European Substantive Examination Report dated Apr. 15, 2009 in EP 05 821 794.4.

(Continued)

*Primary Examiner* — Ahmad Matar
*Assistant Examiner* — Nafiz E Hoque
(74) *Attorney, Agent, or Firm* — Nixon & Vanderhye PC (57) ABSTRACT

The application relates to the registration of the identity of a telephone terminal in association with the identity of a computer terminal in a Computer Technology Integration environment CTI-enabled switching apparatus and a registration server interconnected by a CTI-link and a telephony link. A registration method whereby the registration is essentially achieved by using the telephony link to present PIN data inputted using the telephone terminal to the registration server and to identify the from the CTI-link the identity of the telephone terminal which presents the PIN data over the telephony link faces the problem of how to tie in the correct CLI to the correct call. This problem is solved by the application in that the port of telephony link used by the switching apparatus for the call by which the PIN data is transmitted is transmitted in combination with the CLI over the CTI-link. The registration server retains information on which port of the switching apparatus is associated with which registration server port and a table look-up is being used to find out at which port of the registration server the call over said telephony link is received.

18 Claims, 2 Drawing Sheets

U.S. PATENT DOCUMENTS

| | | | |
|---|---|---|---|
| 6,594,357 B1 * | 7/2003 | Emerson et al. | 379/265.04 |
| 2002/0131573 A1 | 9/2002 | Berkley et al. | |
| 2004/0066926 A1 | 4/2004 | Brockbank et al. | |
| 2004/0136346 A1 * | 7/2004 | Booton | 370/338 |
| 2005/0047395 A1 | 3/2005 | Narin et al. | |

FOREIGN PATENT DOCUMENTS

| | | |
|---|---|---|
| EP | 1 832 102 B1 | 8/2010 |
| WO | WO 99/51015 A | 10/1999 |
| WO | 00/59190 | 10/2000 |
| WO | 02/076071 A1 | 9/2002 |
| WO | WO 02/080513 | 10/2002 |
| WO | 03/028357 A1 | 4/2003 |

OTHER PUBLICATIONS

"Services for Computer Supported", Telecommunication Applications (CSTA) Phase I (1992).

European Search Report for PCT/GB2005/005072 received Mar. 14, 2006.

Brockbank, R., et al., "ClickDial Web-Enabled CTI," *British Telecommunications Engineering*, vol. 18, Apr. 1999, pp. 18-24.

Services for Computer Supported Telecommunication Applications (CSTA) Phase 1 (1992).

* cited by examiner

REGISTRATION OF A TELEPHONE/COMPUTER ASSOCIATION IN A COMPUTER TELEPHONY INTEGRATION ENVIRONMENT

This application is the U.S. national phase of international application PCT/GB2005/005072 filed 23 Dec. 2005 which designated the U.S. and claims benefit of GB 0428538.3, dated 31 Dec. 2004, the entire content of which is hereby incorporated by reference.

This invention relates to a method of registering a telephone terminal in association with a computer terminal in a Computer Telephony Integration (CTI) environment.

In a CTI environment, a user can enter a command at his computer terminal for a call to be made to a destination number. CTI also increases the flexibility of switches enabling their capabilities to be enhanced in a telecommunications network. A introduction to CTI technology can be found in the IEEE on-line article "Computer Telephony Integration and Its Applications by Sheng-Lin Chou and Yi-Bing Lin, available from http://www.comsoc.org. Further articles on CTI are referred to in the prior art documents discussed later hereinbelow.

In a CTI environment, the CTI system resource architecture manages the telephony and computing resources. In addition, any CTI system will also include a switch-to-host interface for connecting CTI-enabled switching apparatus to the CTI server (a remote host) and an application programming interface (API). The API enables new functions/services for the CTI system to be developed.

This invention exploits the switch-to-host interface which provides a connection between the switching apparatus and the remote host computer. The remote host computer provides a registration facility and may also function as the CTI server, although a separate CTI server may also be provided for controlling the switching apparatus as will be appreciated by those skilled in the art. The CTI server is connected to the switching apparatus via a CTI link. Whereas non-CTI switches are usually closed systems without any interfaces providing external control, in contrast, in a CTI environment, the CTI-enabled switching apparatus is externally controlled by a CTI server running appropriate applications. This interface (referred to herein as the CTI interface or the CTI link) is different from a phone line interface.

The CTI server also provides a telephony environment via an application programming interface (API) to enable software developers to create new telecommunication applications, for example TAPI is a Microsoft™ API for personal computers (PCs) running the Windows™ operating system.

Many known registration schemes require the registering terminal to transmit its identity (known as its calling line identity (CLI), for example see WO 99/51015, entitled COMPUTER TELEPHONY INTEGRATION"). However, it is not always possible to transmit a CLI (for example, if the registering terminal is located in a network which does not transmit CLI information, such as are found in some countries).

One known registration scheme which seeks to provide a solution to the problem of performing a secure terminal registration in the event no CLI information can be transmitted by the registering terminal is described by Robert G. Brockbank and Derek J. Emerson in WO 02/076071 (entitled "COMPUTER TELEPHONY INTEGRATION", the text of which is hereby incorporated into the description by reference). This scheme associates a telephone terminal and a computer terminal by using codewords to ensure the registration process is independent of the telephone identifying itself via CLI to the registration system. In WO 02/076071, the host computer originates a call to the user at the number at which the user wishes to receive the registration call and which the user has previously notified to the host computer, preferably via the user's computer and a data link. The user has to answer that originating call from the host computer, and then he can provide the codeword, for example, to voice recognition equipment provided in the system. WO 02/076071 describes several registration schemes, including the use of persistent client side information (known to those skilled in the art as cookies).

The invention seeks to provide an improved registration scheme in the event no CLI information can be transmitted by the registering terminal to the registration server. Advantageously, it does not require Interactive Voice Recognition (IVR) equipment.

SUMMARY STATEMENTS OF THE INVENTION

The aspects of the invention are as provided in the accompanying independent claims and features of the preferred embodiments of the invention are as set out in the accompanying claims dependent thereon.

Those skilled in the art will appreciate that the above aspects as set out in the independent claims can be combined with any of the dependent features as set out in the dependent claims in any appropriate manner apparent to those skilled in the art.

Specific embodiments of the invention will now be described by way of example with respect to the accompanying drawing in which:—

Figure 1:
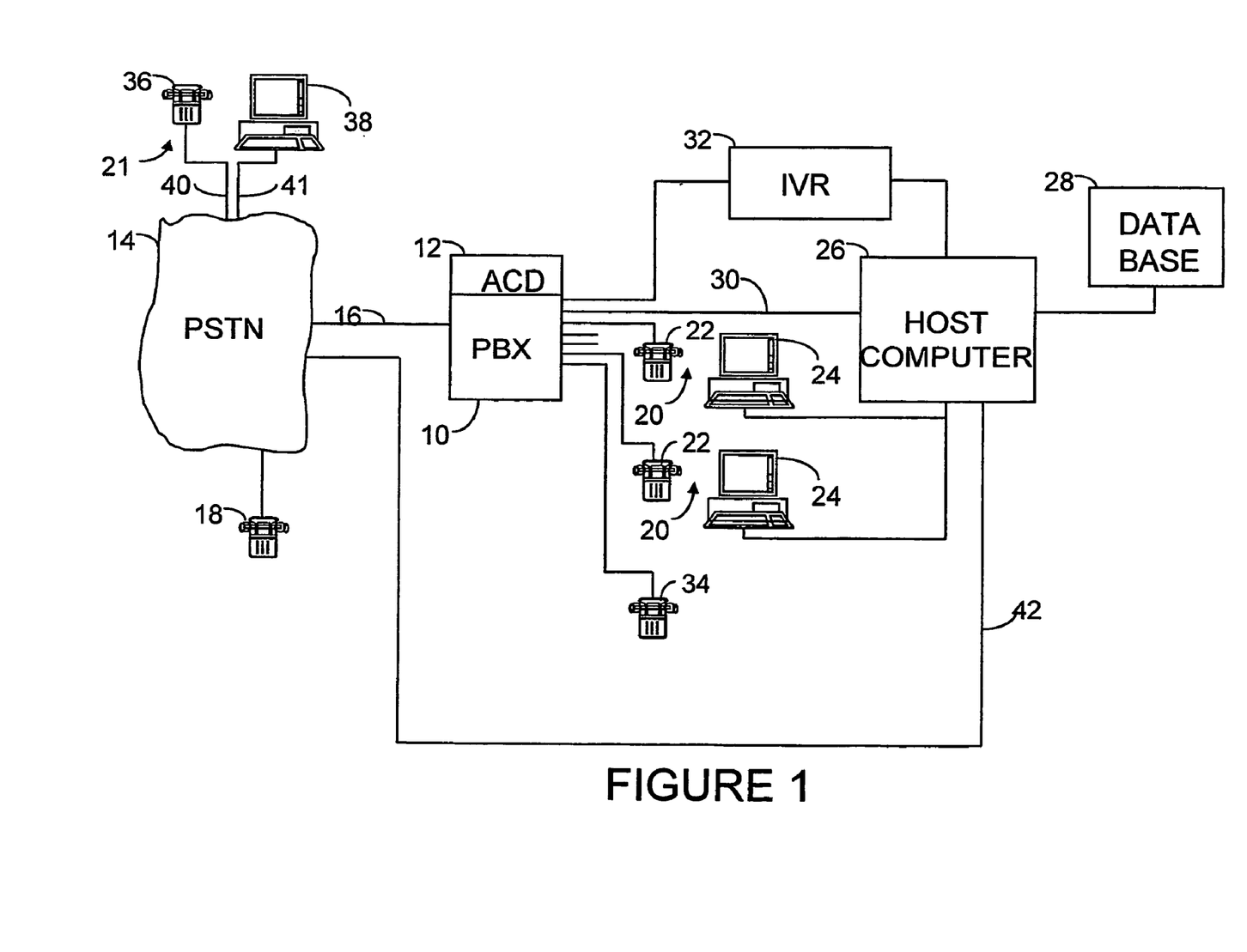
FIG. 1 shows an CTI ACD system implementing a registration scheme as known in the art.

To set the invention in the appropriate context, the scheme described in WO 02/076071 will now be described in more detail with reference to FIG. 1 of the accompanying drawings. FIG. 1 shows schematically an automatic call distribution (ACD) suite of a type used in a call centre to manage the operation of a large scale (e.g. national) telephone account. This type of ACD suite and its operation is described in detail in International Application Number PCT/GB96100727 (Publication Number WO 96/31044) and for the purposes of the present invention this type of ACD suite will be described only briefly in respect of its component parts, and relevant operational characteristics.

The ACD suite comprises a private branch exchange (PBX) 10, constituting a switching system of the present invention, associated with an ACD system 12 and connected to a Public Switched Telephone Network (PSTN) 14 by an appropriate transmission link 16, such as is known in the art to include a common signalling channel.

Customers, represented by telephone terminal 18, make calls to the call centre. These incoming calls are received at the PBX 10 and placed in a queue by the ACD system 12. The ACD system 12 allocates the call at the head of that queue to a selected one of a plurality of call centre agent positions (the agents being users of the ACD system 12). These positions comprise call centre-based at positions 20 (also referred to as workstations), each comprising a telephone terminal 22 (also referred to as an ACD turret) and an associated computer terminal 24, and/or remote user positions (e.g. teleworking positions), represented by remote workstation 21 comprising telephone terminal 36 and associated computer terminal 38.

Each computer terminal 24 is constituted by a personal computer, commonly referred to as a PC, and is connected to a host computer 26 having an associated database 28 and connected to the PBX 10 via a CTI link 30. An interactive voice response system (IVR) 32 is connected to a port of the PBX 10 and to the host computer 26, and is arranged to obtain data from customers, and remote users of the ACD system (e.g. teleworking agents), and to pass this to the host computer 26 for processing as appropriate. In FIG. 1 only two workstations 20 are shown although in a call centre of a large company there may be in the region of a hundred workstations 20. In variants, the computer terminals 24 are dumb terminals and rely on the processing power of the host computer 26.

The location of a remote workstation 21 could be one of a variety of places. For the purpose of this example it will be assumed that the remote workstations 21 are located in the private residences of remote users of the ACD system (e.g. the homes of teleworking agents), the telephone terminal 36 being connected to the PSTN 14 via a respective local line 40, and the computer terminal 38 being connected to the PSTN 14 via a respective local line 41 and a modem (not shown). The host computer 26 is connected to the PSTN 14 via a local line 42 and a modem (not shown). Alternatively, instead of the local line 42, the connection may be via a voice channel through the PBX 10.

In general, when an user of the ACD system 12 (e.g., an agent) starts a work period at a workstation 20, or at a remote workstation 21, he or she can log on to the ACD system 12:

i) directly using their telephone terminal 22, 36 (by providing spoken, dialed/keyed input);

ii) via computer terminal 24, the host computer 26 and the CTI link 30;

iii) via the computer terminal 38, the PSTN 14, the link 42, the host computer 26 and the CTI link 30.

The host computer 26, constituting a call control apparatus of the present invention, is programmed to monitor activity of the call control processor (not shown) of the PBX 10 and to send command messages to the call control processor as will be described below.

The host computer 26 contains a list of the identities of, say, ten virtual terminals 34 which are designated as virtual turrets for remote users (e.g., for teleworking agents) only and have no physical existence. In this example, the PBX 10 is configured so that it has a set of port identities corresponding to the identities of the virtual terminals 34, these port identities not being associated with any physical ports of the PBX 10 and being merely virtual ports. In other words, the call control processor will command connection of the ringing current generator to a selected virtual port under the control of the ACD 12, and cease the connection under the control of the host computer 26, but the PBX 10 will not be aware that these virtual ports have no physical existence.

In order to support remote users accessing the ACD system, for example, such as is required by teleworkers, the ACD system 12 must still associate a remote users identity with the identity of what it deems to be an active terminal 22 in the call centre.

WO02/07671 describes a prior art secure registration scheme for such an ACD environment. The registration scheme according to the prior art is also for use in situations where the CLI of the telephone terminal 36 is not received by the PBX 10. In this example, computer terminal 38 is used to dial the directory number of the host computer 26. When a connection has been established via the PSTN 14, the remote user of the ACD 12 who is seeking registration (e.g., a teleworker) logs on to the host computer 26 and initiates a telephone/computer association registration procedure.

The host computer 26 receives a computer identity from the computer 38, and in response sends data for a screen display, i.e. a page, including a text entry box, and a text invitation for the remote user to enter the PSTN number, also referred to as the remote user's directory number (DN), of the telephone terminal 36 which the user wishes to be registered in association with the computer terminal 38.

The remote user enters his/her DN in the text entry box, and clicks on a reply button to send this information to the host computer 26, which stores the remote user's DN temporarily in association with the identity of the remote user and the identity of the computer terminal 38.

The host computer 26 now enters a security phase of the registration procedure.

The host computer 26 responds to receipt of the DN from the computer 38 by sending a page including a codeword, CW, in the form of nine randomly generated digits, by instructing the PBX 10 to make a call to the DN, and to connect the IVR 32 to that call for receiving data from the remote user, and by starting a first timeout of a few seconds, e.g. two seconds, just sufficient for one cycle of the conventional alerting (ringing) signal. If the PBX 10 does not report to the host computer 26 that the call has been answered before the first timeout has expired, the host computer 26 instructs the PBX 10 to cancel the call, and to enter a rejection mode.

Assuming that the remote user has answered the call before the expiration of the first timeout, the PBX 10 reports to the host computer 26 that the call has been answered. The host computer 26 then instructs the IVR 32 to play a prompt requesting that the codeword appearing on the computer screen be keyed on the telephone keypad, and starts a second, interdigit, timeout of twenty seconds, i.e. sufficient time for the remote user to read the codeword and key it on the telephone keypad. If the interdigit timeout expires before the host computer 26 receives from the IVR 32 the required number of digits keyed in by the remote user, the host computer 26 instructs the PBX 10 to clear that call to the remote user, and a suitable message is sent for display on the remote user's computer screen.

The host computer 26 compares these received digits with the codeword sent to the computer terminal 38, and if they match confirms the stored association of the received DN with the identity of the computer terminal 38, and sends a further screen display to the computer terminal 38 containing the text message "Thank you. Now please hang up.", and instructs the IVR 32 to play a corresponding "Thank you" prompt. The DN and computer terminal identity are stored in respective fields of a registration record, and a ninety day validity period is set for that registration record. When that ninety day period has expired, the registration record is marked as invalid.

The above scheme therefore requires IVR 32 to be implemented in association with each PBX to enable secure registration.

Figure 2:
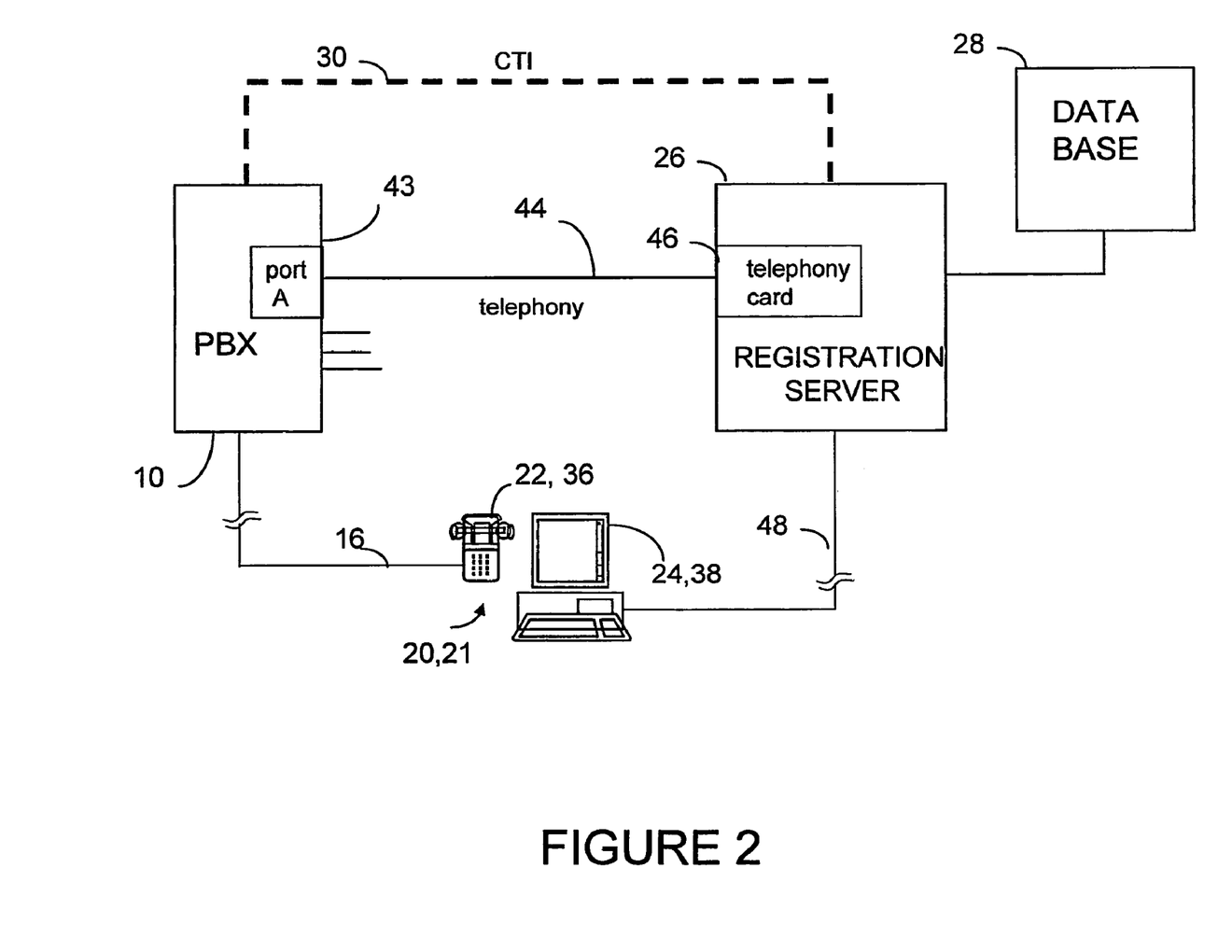
FIG. 2 shows schematically a secure registration system according to an embodiment of the invention.

FIG. 2 of the accompanying drawings shows a secure registration system according to the present invention for a CTI-environment, such as an ACD suite. In FIG. 2, features of the secure registration system also shown FIG. 1 retain their numbering scheme where appropriate.

As shown in FIG. 2, CTI-enabling switching apparatus 10 comprises a private branch exchange equipment (PBX). The switching apparatus 10 is arranged to establish one or more telephony links 44 with the registration server 26 in addition to having at least one CTI link 30 with the registration server 26.

The registration server 26 is arranged to provide a telephone number to the computer apparatus 38, for example, as the content of a web-page. When this telephone number is called, a telephony link 44 is established between a port 43 of the switching apparatus 10 and a port on telephony card 46 of the registration sever 26. The user of workstation 21 operates telephone terminal 36 to place the call to the telephone number received by computer terminal 38 from the registration server 26. As shown in FIG. 2, the registration server 26 which provides the telephone number will be contacted when a call is placed to the telephone number. However, in alternative embodiments of the invention, the telephone number can be generated by a separate registration server (not shown), which need not participate any further in the registration process.

The port 43 of switching apparatus 10 is now connected by telephony link 44 to processing means (not shown) at the registration server 26 via a telephony card 46. The processing means of the secure registration server 26 is arranged to process information received via the telephony link 44 and also via CTI-link 30 to register the association of telephone terminal 36 and computer terminal 38.

A unique code number is entered by using the telephone terminal 36 as an input device once the call has been established with the registration server 26. In one embodiment of the invention the unique code is provided to the computer terminal 21 by the registration server as part of the web-content it displays. The user of the workstation 21 may alternatively, or in addition to any unique code provided by the registration server, use telephone terminal 26 to transmit their own personal identification number (PIN) to enable their use of the telephone terminal 36 and the computer terminal 38 to be registered. If no PIN-related information is provided, the telephone terminal and computer terminal are associated with each other only in certain embodiments of the invention. Whilst the registration process is primarily intended for remote users, e.g., users of workstation 21 comprising telephone terminal 36 and computer terminal 38, the registration process can also be modified to enable all users of the CTI-system to be appropriately registered.

The switching apparatus 10 receiving the call from the telephone terminal the user operates to dial the given telephone number establishes a telephony link between the telephone terminal 36 and the registration server 26. Any suitable physical form for the telephony link may be used, and the call may be transmitted in part via a wireless connection, optical connection, infra-red connection etc., etc. Traditional telephony or Voice over Internet Protocol (VoIP) links may be used. Alternatively, other connection technology and protocols may be implemented providing the user is able to perform registration by sending PIN data over the connection formed between the telephone terminal and the registration server. The computer terminal 38 is connected directly to the registration server 26 via an appropriate communications link 48 (for example, a "always-on" (e.g. broadband) or dial-up link). Again, the connection itself may include wireless, optical, infra-red connections etc., etc and use any appropriate protocol. The CTI-enabled switching apparatus 10 connects the telephony link to the registration server using a first communications link 44, in this embodiment of the invention a telephony link. The switching apparatus is also connected via a CTI communications link 30 to the registration server 26. In alternative embodiments of the invention, the CTI-communications link 30 may be indirect between the switching apparatus and the registration server, providing the CTI functionality remains.

The registration server 26 as shown in FIG. 2 functions as a host computer 26 to generate a CTI monitor on the PBX port 43. When a remote user of the system seeks to register their telephone terminal 36 and computer terminal 38 in association with each other, the user accesses a registration web-page using a client application running on the computer terminal 38 in the manner known to those skilled in the art (for example, by accessing the appropriate web-page using its uniform resource locator (URL) and an appropriate web-browser application). In this embodiment, the registration web-page is delivered by the registration server 26 which performs the registration process. Those skilled in the art will appreciate that another server could also deliver the web-page. In such embodiments, the other server relays the registration information to the registration server functioning as the host computer controlling switching apparatus 10. The host computer functioning as the registration server 26 retrieves appropriate stored information to confirm the unique code information and complete the registrations process. The stored information (for example, the user's authentication details associated with their PIN code) is stored in database 28 shown in FIG. 2, and once retrieved, the stored information is compared with information received as part of the authentication process. In the event of a match, the registration process is successfully completed.

The web-page prompts the user to call the telephone number provided to gain access to the registration server 26 and once connected to enter the unique code data (for example, a personal identification number (PIN), or to supplement the code provided by the web-page with the users own predetermined PIN to provide a unique code) using their telephone terminal. The user is informed of the required telephone number and PIN via any appropriate means deliverable via a web-page (e.g., by means of its visual and/or be audio content).

In embodiments of the invention where the telephone number provided assists in the registration process, the computer terminal may be sent the PIN information the user is to enter only after the user has connected to the remote host using the telephone number. In the case, the user remains on hold until they receive the PIN information and they are able to provide the PIN to the registration server by using their telephone as an input device (either by pressing keys or dialing appropriate numbers etc.) In one embodiment of the invention, the PIN serves to uniquely identify the association of the telephone and computer terminals. Alternatively, it may additionally uniquely identify the user of the telephone and computer terminals.

It is assumed that telephone terminal 38 is unable to provide its calling line identity to the registration server 26. For example, it may not be possible for the CLI of telephone terminal 36 to be transmitted across the telephony link 44 to registration server 26.

To enable the identity of the telephone terminal 36 to be determined and to associate this with a specific computer terminal 38, the registration server 26 exploits the functionality provided by the CTI link 30 with CTI-enabled switching apparatus 10. This is achieved by the registration server 26 setting up CTI-monitoring of switching apparatus 10, for example, CTI-monitoring of one or more or all of the outputs of switching apparatus 10 such as port 43.

When the remote user dials the telephone number to access the registration server 26, the call is delivered via port 43 of the switching apparatus 10. The CTI-monitoring of switching apparatus 10 then generates additional information related to the telephony call which is relayed to the registration server 26 via the CTI-link 30. This additional information enables the identity of the telephone terminal 36 to be uniquely determined and identifies the output port 43 used by the switching apparatus 10 to forward the telephony call made by the telephone terminal 36 to the registration server 26. In a conventional telephony environment, the information uniquely identifying telephone terminal 36 comprises its CLI, but other information uniquely identifying the physical address of the telephone terminal may be provided in alternative embodiments of the invention.

Other additional information, for example events which can be used to trigger when security features are enabled may be detected by the CTI link. As an example, in one embodiment the registration server 26 also detects when the telephony call is received via telephony card 46 (and it may also detect when the data representative of the unique code information is entered). This enables appropriate time-out counters to be put in place as a security measure.

One embodiment of the invention supplements the process by requiring the user to re-enter a secondary code generated after the initial code had been entered by the user. This secondary code is displayed on the computer terminal and the user re-iterates the data entry process to enhance the security of the registration process.

The registration server 26 processes the information received from the CTI-interface with the switching apparatus 10 (including the information uniquely identifying the telephone terminal 38 such as its CLI) with the information the user provides using the telephone terminal as an input device (such as the PIN), which the registration server has received via the telephony card 46. The information received is processed and compared with information retrieved from database 28 to register the association of the telephone terminal 36 and the computer 38 (and additionally, in certain embodiments, to uniquely identify the user of the telephone terminal 36 and computer terminal 38). The matching of the received information with stored information can be performed in accordance with any appropriate verification process known to those skilled in the art.

The embodiment of the invention described in relation to FIG. 2, shows only one telephony link 44 is shown between switching apparatus 10 and the registration server 26. In reality, the throughput of the system is likely to require multiple registrations to occur simultaneously (and a plurality of "links" may be required). In such embodiments of the invention, the additional information may further identify the output port of the switching apparatus 10 used to establish the telephony link with the registration server. This enables the association of the PIN information received on that telephony link with the unique terminal identification information received via CTI-link 30 with the switching apparatus.

In one embodiment, the additional information comprises hardware information indicating the correct port sent over the CTI interface of the system, for example, a terminal number (TN) may be provided if the switching apparatus 10 comprises a PBX of a type conforming to Nortel's Meridian PBX equipment and the additional information will then also comprise which physical TN is wired to each individual port on the registration server 26. In this embodiment of the invention, the registration server 26 will also retain information on which TN is associated with which registration server port. The registrations server is informed which TN on the PBX is being used to deliver the call (via CTI link 30), and uses a table look-up to find out which port at the registration server it can expect the call on. This enables the registration server to tie in the correct CLI to the correct call.

Thus by sending both a telephone number and unique code confirmation to the computer terminal, and by using the telephony link established by calling the telephone number to present the code number to the registration computer 26, the registration server 26 is able to identify from the CTI-link with the switching apparatus the identity of the telephone terminal used to establish the telephony link, and is able to associate the computer terminal to which the code was sent with that telephone terminal when the registration server receives the code along the telephony link.

The registration process may further refer to stored information to confirm the received information matches the information stored for the computer terminal and/or telephone terminal. In addition, if the code is a PIN unique to the user, or if in addition to a unique code for associating the telephone terminal with the computer terminal sent by the registration server 26 to the telephone terminal 36, the user enters their own PIN information, the PIN information may be used to associate a specific user with the association of the telephone terminal 36 and the computer terminal 38.

The registration server is then able to know the identity of the computer terminal 38 (as this has the terminal address to which the web-page content was delivered to) and associates the computer terminal 38 which the telephone terminal identity (as the CTI-link provides this information). Providing the code delivered to the web-page matches the code received via the telephony card 46 from the user's telephone terminal 36, the registration server is able to associate the user's computer terminal 38 with their telephone terminal 36.

In one embodiment of the invention, telephony link 44 comprises a primary rate connection (PRI) which does not support CLI. The registration server is able to identity which channel within the PRI is being used to deliver the call using the information conveyed via the CTI interface 30.

Alternatively, requests for registration sent to the registration server 26 via switching apparatus 10 can be queued via CTI interface 30. In this embodiment, a request is separated into an appropriate time-frame, thus allowing enough time to identify which CLI is associated with which delivered call. The registration server 26 handles multiple requests, effectively simultaneously as the time-frame for processing each request is relatively small compared to the length of time to process the registration.

If it is not practical to separate the requests by timeframe, in another embodiment of the invention, it is possible to separate the requests according to the Dialed Number Identification Service of the access number to be called for a particular registration server 26 (one or more registration servers may be provided, depending on the DNIS allocated to each call). For example, the PRI 44 connecting the switching apparatus 10 to the registration server 26 could be given a number range (for example, 200 numbers, e.g. xxx000 to xxx099). Calls are queued at the switching apparatus 10 by a first registration server 26 sending control information via the CTI interface 30. The first registration server 26 allocates a particular DNIS associated with a registration server (which may or may not be another registration server). The call is then forwarded to the registration server associated with the particular DNIS. The registration server 26 receiving the call over a particular DNIS uses this information to associate the originating telephone terminal with the CLI information received via CTI interface 30.

In another embodiment of the invention, the user is presented with a range of numbers in the content of the web-page and places a call to a particular number, thus generating DNIS information. The CTI interface 30 will then relay the DNIS information received via PBX 12 to the registration server 26 together with the other additional information provided by the CTI interface 30. In this way, the registration server is able to associate the DNIS over which a particular call arrives (which provides the unique code information) with the CLI information received over the CTI interface 30.

In the above embodiments of the invention, the telephony link 44 may comprise any appropriate VoIP link (for example, an h.323 trunk link). In an alternative embodiment, the telephone terminal instead forms a connection (via the switching apparatus 10) comprising a plurality of logical communications links (e.g., in the event that the connection is split over multiple network interface cards, each having a unique physical (e.g. medium access control (MAC) address). In such an example, the additional information sent over CTI interface 30 to the registration server will comprise the actual physical address (or a plurality of addresses) capable of uniquely identifying the user's telephone terminal 36.)

Those skilled in the art will appreciate the telephone terminal 36 referred to above may comprise a fixed or portable device, and that the telecommunications link 16 may include wireless segments (for example, a blue-tooth connection, an IR connection, a mobile-telephony connection, a WI-Max connection, etc, etc). Similarly, the computer terminal 38 may comprise a fixed or portable device and the communications link 48 may include wireless segments (for example, a blue-tooth connection, an IR connection, a mobile-telephony connection, a WI-Max connection, etc, etc). The telephone may be integrated with another device (including the computer terminal 38) in some embodiments of the invention.

Those skilled in the art will find apparent numerous equivalents and modifications to the features described hereinabove in the detailed description of the embodiments of the invention. The scope of the invention should therefore be interpreted by the accompanying claims, rather than the specific embodiments described hereinabove.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The text of the abstract repeated below is hereby incorporated into the description:

In a Computer Telephony Integration environment, a method of, and system for, registering the identity of a telephone terminal in association with the identity of a computer terminal, the method comprising the steps of: sending a telephone number for accessing a registration server and a personal identity number (PIN) to the computer terminal; establishing a communications link between the telephone terminal and said registration server by calling the telephone number sent to the computer terminal, said communications link being switched at least once by a CTI-enabled switching apparatus connected to said registration server; determining at said CTI-enabled switching apparatus additional information including uniquely identifying the telephone terminal from which the call originates; transmitting said additional information from the CTI-enabled switching apparatus to the registration server along a separate communications channel to the communications channel connecting the telephone terminal and the registration server; at the registration server, processing the additional information to determine the port from which the received call originates at the CTI-enabled switching apparatus and to uniquely identify the telephone terminal from which the call originates; receiving from said port PIN data inputted using the telephone terminal; processing the received PIN data and the additional information to associate the telephone terminal with the computer terminal if the received information matches stored information; and, in the event of a match, registering the identity of the telephone terminal in association with the identity of that computer terminal.

The invention claimed is:

1. A method of registering the identity of a telephone terminal in association with the identity of a computer terminal, the method comprising:

a registration server performing a computer-telephony integration (CTI) monitoring of one or more or all of the output ports of a CTI-enabled switching apparatus;

sending a telephone number for accessing the registration server and a unique code to the computer terminal;

said telephone terminal making a telephone call to said telephone number;

establishing a communications link between the telephone terminal and the registration server identified by said telephone number, said communications link being switched along a first communications channel by said CTI-enabled switching apparatus to connect said telephone terminal to said registration server to establish a telephony link between one of said CTI monitored output ports of the CTI-enabled switching apparatus and a port on a telephony card of the registration server;

at said CTI-enabled switching apparatus determining additional information which enables the identifying of the telephone terminal to be uniquely determined and which identifies the CTI monitored-output port used by the CTI-enabled switching apparatus to forward the telephone call made by the telephone terminal to the registration server; and transmitting said additional information from the CTI-enabled switching apparatus to the registration server along a CTI communications channel; and, at the registration server determining a telephone call has been received on said telephony link from said monitored output port;

processing the received additional information for the CTI-monitored output port to determine a unique telephone terminal identity of said telephone terminal from which the received telephone call originates;

receiving from said monitored output port unique code data inputted using the telephone terminal; and comparing the received unique code data inputted using said telephone terminal with stored information to register the identity of the telephone terminal determined from said additional information with the identity the computer terminal to which the unique code was sent, if at least the received unique code inputted using said telephone terminal matches said stored information.

2. A method as claimed in claim 1, wherein said unique code comprises a personal identification number (PIN) for the user, and if at least the received PIN data matches previously stored information, the method further comprises:

registering the identity of the telephone terminal in association with the identity of the computer terminal in association with a user identity for a user of the said telephone terminal and the said computer terminal.

3. A method as claimed in claim 1, wherein the additional information uniquely identifying the telephone terminal from which the call originates comprises a physical address of the telephone terminal.

4. A method as claimed in claim 1, wherein said CTI-enabled switching apparatus comprises private branch exchange (PBX)-type equipment connected to said registration server via a telephony communications link.

5. A method as claimed in claim 1, wherein the additional information uniquely identifying the telephone terminal from which the call originates comprises a calling line identification for the telephone terminal.

6. A method as claimed in claim 1, wherein the additional information identifies the channel over which the code data is to be received from the CTI-enabled switching apparatus.

7. A method as claimed in claim 1, wherein the registration server receives the code data along a communications channel associated with unique dialed number information service (DNIS) information, and wherein said additional information includes the DNIS information identifying over which communications channel said code data is to be received.

8. A computer-telephony integration (CTI)-enabled switching apparatus arranged for use in a system for registering the identity of a telephone terminal in association with the identity of a computer terminal, the computer-telephony integration (CTI)-enabled switching apparatus being arranged to switch a communications link established between a telephone terminal and a registration server identified by a telephone number, the link being established when said telephone terminal makes a telephone call to said telephone number, the communications link being switched along a communications channel by said CTI-enabled switching apparatus to connect said telephone terminal to said registration server by a telephony link established between one of a plurality of output ports of the CTI-enabled switching apparatus monitored by said registration server and a port on a telephony card of the registration server,
the apparatus further comprising:
a data processor for determining additional information which enables the identity of the telephone terminal to be uniquely determined and which identifies the CTI monitored output port used by the CTI-enabled switching apparatus to forward the telephone call made by the telephone terminal to the registration server; and
a transmitter for transmitting said additional information from the CTI-enabled switching apparatus to the registration server along a CTI communications channel, the CTI-enabled switching apparatus being further arranged to send to said registration server from said monitored output port unique code data inputted using the telephone terminal.

9. A registration server arranged in use to perform CTI-monitoring of an output port of an CTI switching apparatus, the registration server comprising:
a receiver arranged to receive a telephone call on a telephony link from a CTI-monitored output port of said CTI switching apparatus;
a receiver arranged to receive additional information for said CTI-monitored output port along a CTI communications channel;
a data processor arranged to process said received additional information for the CTI-monitored output port to determine a unique telephone terminal identity of a telephone terminal from which said telephone call originates,
wherein said registration server is further arranged to receive from said CTI-monitored output port unique code data inputted using the telephone terminal and to compare the received unique code data inputted using said telephone terminal with stored information to register the identity of the telephone terminal determined from said additional information with the identity the computer terminal to which the unique code was sent, in dependence on at least a match between the received unique code inputted using said telephone terminal and said stored information.

10. A system for registering the identity of a telephone terminal in association with the identity of a computer terminal, the system comprising:
computer-telephony integration (CTI)-enabled switching apparatus;
a registration server arranged to perform CTI-monitoring of one or more or all of the output ports of said CTI-enabled switching apparatus;
a transmitter for sending a telephone number for accessing the registration server and a unique code to the computer terminal;
a communications link established between a telephone terminal and the registration server identified by said telephone number, the link being established when said telephone terminal makes a telephone call to said telephone number, wherein said communications link is switched along a communications channel by said CTI-enabled switching apparatus to connect said telephone terminal to said registration server by a telephony link established between one of said CTI-monitored output ports of the CTI-enabled switching apparatus and a port on a telephony card of the registration server;
wherein said CTI-enabled switching apparatus comprises:
a processor for determining additional information which enables to identify the telephone terminal so that it is uniquely determined and which identifies the CTI monitored output port used by the CTI-enabled switching apparatus to forward the telephone call made by the telephone terminal to the registration server; and
a transmitter for transmitting said additional information from the CTI-enabled switching apparatus to the registration server along a CTI communications channel, wherein said registration server comprises:
a receiver arranged to receive a telephone call on said telephony link from said monitored output port;
a receiver arranged to receive said additional information from the CTI-enabled switching apparatus along said CTI communications channel; and
a data processor arranged to process the received additional information for the CTI-monitored output port to determine a unique telephone terminal identity of said telephone terminal from which the received telephone call originates,
the registration server being further arranged for receiving from said monitored output port unique code data inputted using the telephone terminal and to compare the received unique code data inputted using said telephone terminal with stored information to register the identity of the telephone terminal determined from said additional information with the identity of the computer terminal to which the unique code was sent, in dependence on a match between at least the received unique code inputted using said telephone terminal and said stored information.

11. A method of registering the identity of a telephone terminal in association with the identity of a computer terminal, the method comprising,
at a registration server arranged in use to perform CTI-monitoring of an output port of a CTI switching apparatus:
receiving a telephone call on a telephony link from a CTI-monitored output port of said CTI switching apparatus;
receiving additional information for said CTI-monitored output port along a CTI communications channel;
processing said received additional information for the CTI-monitored output port to determine a unique telephone terminal identity of a telephone terminal from which said telephone call originates;
receiving from said CTI-monitored output port unique code data inputted using the telephone terminal; and comparing the received unique code data inputted using said telephone terminal with stored information to register the identity of the telephone terminal determined from said additional information with the identity the computer terminal to which the unique code was sent, in dependence on at least a match between the received unique code inputted using said telephone terminal and said stored information.

12. A system as claimed in claim 10, wherein said unique code comprises a personal identification number (PIN) for the user and the registration server is further arranged:
  to determine if at least the received PIN data matches stored information; and
  to register the identity of the telephone terminal in association with the identity of that computer terminal for a user of the telephone terminal and the computer terminal in the event of a match.

13. A system as claimed in claim 12, wherein said stored information includes user information uniquely identifying the user of said telephone terminal and the computer system, wherein said PIN data is matched with stored user information to identify the user and register their use identity in association with said associated telephone terminal and computer terminal.

14. A system as claimed in claim 10, wherein the additional information uniquely identifying the telephone terminal from which the call originates comprises a physical address of the telephone terminal.

15. A system as claimed in claim 10, wherein said CTI-enabled switching apparatus comprises private branch exchange (PBX)-type equipment connected to said registration server via a telephony communications link.

16. A system as claimed in claim 10, wherein the additional information uniquely identifying the telephone terminal from which the call originates comprises a calling line identification for the telephone terminal.

17. A system as claimed in claim 10, wherein the additional information comprising information identifying the channel over which the code data is to be received from the CTI-enabled switching apparatus.

18. A system as claimed in claim 10, wherein the registration server receives the code data along a communications channel associated with unique dialled number information service (DNIS) information, and wherein said additional information includes the DNIS information identifying over which communications channel said code data is to be received.

\* \* \* \* \*